United States Patent [19]
Galantay et al.

[11] 3,719,670
[45] March 6, 1973

[54] SUBSTITUTED CARBINOL DERIVATIVES

[75] Inventors: Eugene E. Galantay, Morristown; Dietmar A. Habeck, Dover, both of N.J.

[73] Assignee: Sandoz-Wander, Inc., Hanover, N.J.

[22] Filed: Sept. 10, 1970

[21] Appl. No.: 71,279

Related U.S. Application Data

[63] Continuation-in-part of Ser. No. 778,777, Nov. 25, 1968, abandoned.

[52] U.S. Cl.....260/239.55 C, 260/397.4, 260/397.5, 424/243
[51] Int. Cl.....................C07c 169/20, C07c 173/00
[58] Field of Search................260/397.4, 239.55 C; /Machine Searched Steroids

[56] References Cited

UNITED STATES PATENTS

| | | | |
|---|---|---|---|
| 3,424,768 | 1/1969 | Klimstra | 260/397.5 |
| 3,637,771 | 1/1972 | Nedelec et al. | 260/397.4 |
| 3,682,985 | 8/1972 | Basco et al. | 260/397.4 |
| 3,086,027 | 4/1963 | Perelman et al. | 260/397.3 |
| 3,392,166 | 7/1968 | Edwards et al. | 260/239.55 |
| 3,432,528 | 3/1969 | Anner et al. | 260/397.3 |

OTHER PUBLICATIONS

Vitali et al., Gazz. Chim. 96, 1966, p. 1,126 (pg. 1,132 pertinent).

*Primary Examiner*—Lewis Cotts
*Assistant Examiner*—Ethel G. Love
*Attorney*—Gerald D. Sharkin, Frederick H. Weinfeldt, Robert S. Honor, Walter F. Jewell and Richard E. Vila

[57] ABSTRACT

The compounds are steroidal 17-allenyl carbinol derivatives, e.g., 17α-propadienylestra-4,9-dien-17β-ol-3-one. The compounds have, e.g., progestational activity and are useful in fertility control.

11 Claims, No Drawings

SUBSTITUTED CARBINOL DERIVATIVES

This is a continuation-in-part of copending application U.S. Ser. No. 778,777 filed Nov. 25, 1968, now abandoned.

This invention relates to substituted steroids. More particularly it relates to steroidal 17-allenyl carbinol derivatives and to the preparation thereof, as well as intermediates therefor.

The substituted carbinols of this invention may be represented by the following structural formula I

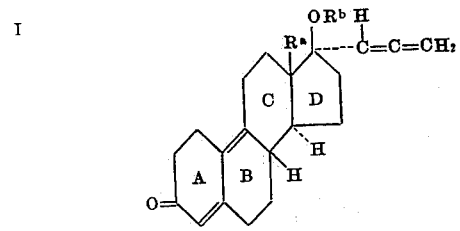

wherein $R^a$ is alkyl having one to three carbon atoms, e.g., methyl, ethyl, n-propyl and isopropyl, and is preferably unbranched; and $R^b$ is a hydrogen atom, methyl, acetoacetyl or lower alkanoyl having two to four carbon atoms, e.g., acetyl, propionyl or butynyl.

The process for preparing the compounds of formula (I) where $R^b = H$, may be represented by the following reaction scheme A:

Reaction Scheme A

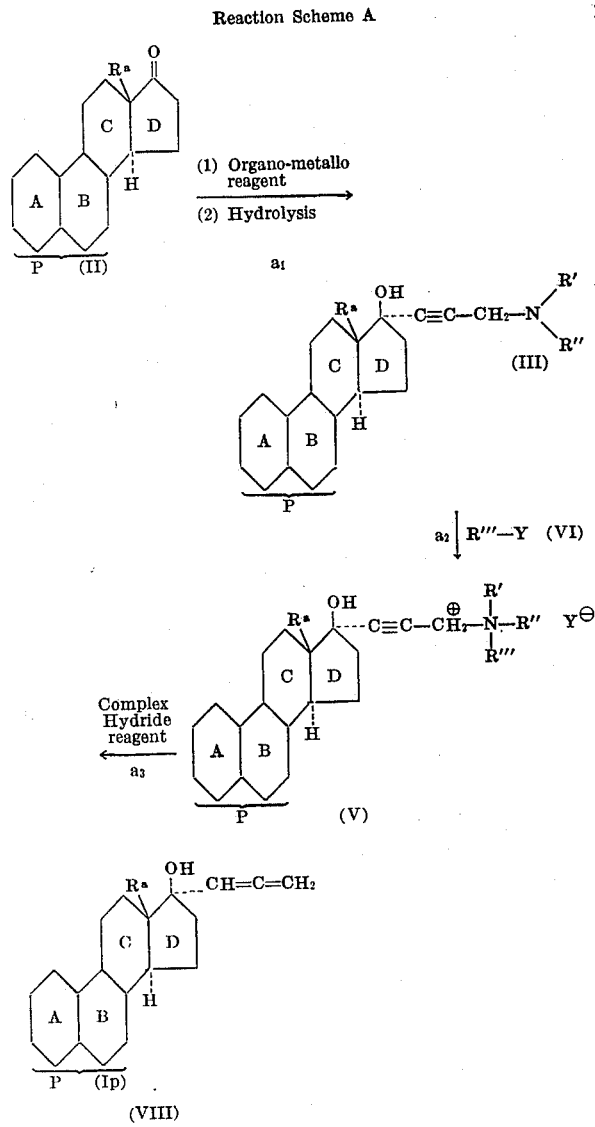

wherein $R^a$ has the above stated significance, and each of R', R'' and R''' is independently lower alkyl having one to three carbon atoms, e.g., methyl, ethyl and propyl; methyl being preferred, P is a protected form of rings A, B and C, as indicated below; and Y is halo having an atomic weight of from 35 to 127 or the residue of a sulfonic acid, e.g., Cl, Br, I, mesylate ion, tosylate ion or the like, preferably I.

The organo metallo reagent (IV) has the composition

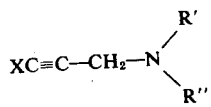

, wherein X is an active metal or magnesium bromide or iodide, e.g., Li, K, Na, Al/3 , Zn/2 , —MgBr, or —MgI, and is prepared by methods disclosed in the literature; and R' and R'' have the above stated significance.

Compound (III) is prepared by treating a corresponding 17-ketosteroid (II) with reagent IV) in a solvent at a temperature of −30° to 100° C., preferably −20° to 50° C. followed by standard hydrolysis of the resulting adduct in neutral or basic aqueous medium, e.g., water or saturated ammonium chloride solution. The solvent used is dependent upon the composition of the organo-metallo reagent. For example, if X is MgBr, MgI or Li, the solvent may be ether or tetrahydrofuran, if X is Na, the solvent may be liquid ammonia-ether, liquid ammonia-tetrahydrofuran, dioxane, pyridine or dioxane-pyridine. Particularly advantageous is the use of X=Li in the presence of complexing amines, e.g., ethylene diamine. This process is represented by step $a_1$. The temperature and solvent are not critical.

Compound (V) is prepared by treating compound (III) with compound (VI) in a solvent such as acetone, etc., at a temperature of −20° to 30° C. This is represented by step $a_2$. The temperature and solvent are not critical.

Compound (Ip) is prepared by treating in a solvent compound (V) with a complex hydride reagent (VII) such as $LiAlH_4$, at a temperature of −80° to 80° C. The solvent may be ether, tetrahydrofuran, pyridine or the like. This is represented by step $a_3$. Again, neither temperature nor solvents are critical.

The compounds of Formula I where $R^b$ is alkanoyl may be obtained using standard methods for acylating a tertiary hydroxy group, e.g., by use of an acylating agent in the presence of a strong acidic catalyst. For example, a compound Ip may be converted into a Compound I where $R^b=OCOCH_3$ by use of e.g., acetic anhydride in which calcium hydride had previously been dissolved.

The compounds of Formula I where $R^b$ is methyl may be obtained in a manner known per se, for instance by treating a compound Ip at a temperature of about −30° to 30° C. with 1–1.2 equivalents of strong base (e.g., $NaNH_2$ or $KNH_2$ in liquid ammonia or $LiCH_3$ in ether) to form a 17-O-anion of compound Ip, and treating the latter, in the same mixture, with 1–50 equivalents of methyl iodide.

Compounds of Formula I wherein $R^b$ is acetoacetyl are obtainable by reacting a compound of Formula I bearing a 17β-hydroxy group with a suitable reagent, e.g., diketene, under conventional conditions employed in carrying out such a reaction. For example, a 17β-hydroxy bearing compound of Formula I may be reacted with diketene in an inert organic solvent, e.g., benzene or toluene or mixture thereof, in the presence of a small amount of organic tertiary amine base, e.g., pyridine, at relatively low temperatures, e.g., at from about −5° to +35° C.

The disclosure below respecting protective groups pertains as well to the above described method for methylating and acylating compounds Ip and III.

Certain compounds of Formula (II) and protected forms thereof are known and may be prepared by methods disclosed in the literature; and those compounds not specifically disclosed may be prepared according to analogous methods from known materials.

Conventional recovery techniques are utilized for obtaining the compounds of Formula (I), e.g., crystallization, column or layer chromatography, etc.

The above-mentioned protected forms P of the steroidal compounds include the structures P1 and P2 embracing rings A, B and C.

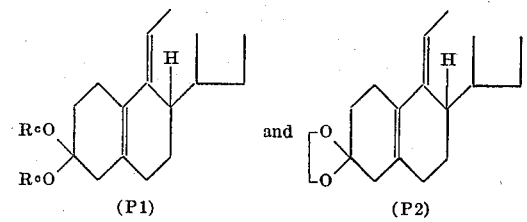

wherein $R^c$ is lower alkyl, e.g., being from one to four carbon atoms, such as methyl, ethyl, propyl or butyl. "Deprotection" can be achieved in conventional ways; i.e., with P1 and P2, hydrolysis in acid medium followed by conjugation of the double bonds in acid or basic medium. The above-described "protected" forms are advantageously retained until compound $I_p$ where $R^b=H$ or $CH_3$ is obtained, which compound may then be deprotected as described above to obtain the unprotected form of a compound I where $R^b=H$ or $CH_3$. A compound of formula I wherein $R^b=H$ can then be converted if desired to a particular compound of Formula I where $R^b=$acyl, by conventional means.

In accordance with an additional aspect of this invention the compounds of Formula III may be prepared by the following Reaction Scheme B, wherein $R^a$, $R'$, $R''$ and P are as defined above.

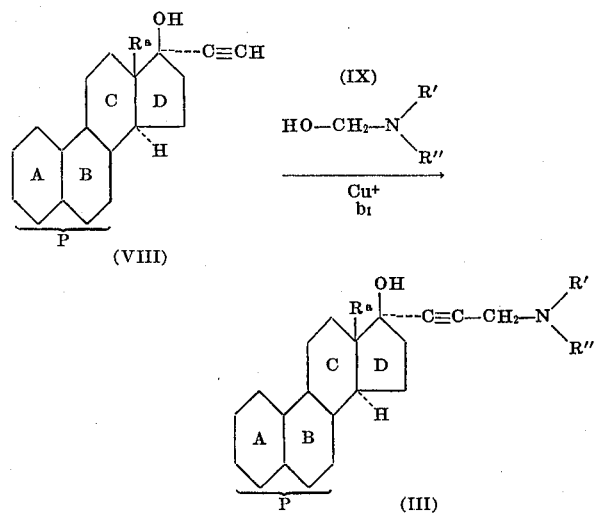

In this scheme, step $b_1$ is a Mannich-type reaction involving the ethynyl group in VIII; it can be carried out under conditions known to be operative in Mannich reactions of this type. Preferably, however, step $b_1$ is carried out with geminal amino alcohols of the type

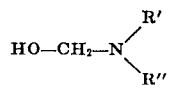

($R'$ and $R''$ being as defined above) in the presence of Cu+ ions and small amounts of weak acid, (e.g., acetic acid), at temperatures of 10° to 80° C., preferably from about 50° to 70° C. in an inert solvent, such as dioxane and tetrahydrofuran.

In the above-described procedures, the starting materials and reagents are known and may be prepared by methods described in the literature, or where not known may be prepared in a manner analogous to that for preparing the known compounds.

The substituted carbinol derivatives represented by formula (I) above are useful because they possess pharmacological properties in animals. In particular, such compounds are useful as fertility control agents in mammals as they possess progestational activity as indicated by standard tests, such as the clauberg test, e.g., the method basically described in Endocrinology 63 (1958) 464 wherein the rabbit is given 0.01 to 1.0 milligrams of active agent.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.01 milligrams to 2 milligrams. This daily dosage may be given in equally divided doses, e.g., two times a day, or a single dose, e.g., in sustained release form. It will be appreciated by those skilled in the art, that the daily dosage level is independent of body weight. Dosage forms suitable for internal administration comprise from about 0.005 milligrams to about 2 milligrams of the compound in admixture with a solid or liquid pharmaceutical carrier or diluent, solid forms being preferred.

The compounds of formula I are also useful as menstrual function regulating agents. For the above-mentioned uses the compounds of formula I may be administered alone in the manner and dosage described above, or in combination with a suitable estrogenic agent, the latter for example at a dosage of about 0.1 mg. The estrogenic agent may be admixed with the compound of formula I, or, alternatively, the estrogenic agent may be administered alone in the first part of the menstrual cycle, and in admixture with the compound of formula I in the latter days of the cycle of the host, i.e., a higher primate.

A representative formulation suitable for oral administration is a tablet prepared by standard tabletting techniques which contains the following:

| Ingredients | Part by Weight |
| --- | --- |
| 17alpha-Propadienylestra-4,9-dien-17beta-ol-3-one | .05 |
| Tragacanth | 2 |
| Lactose | 89.45 |
| Corn starch | 5 |
| Talcum | 3 |
| Magnesium stearate | 0.50 |

The compound 17alpha-propadienylestra-4,9-dien-17beta-ol-3-one is particularly useful as a fertility control agent as it has in addition to its progestational activity, estrogenic activity as well as estrogen-antagonistic activity when administered orally or parenterally at daily dosages of from about 0.1 milligrams to 0.5 milligrams. It will be readily appreciated by those skilled in the art that a compound concurrently exhibiting the three above-mentioned properties is highly desirable as it can be used to obtain efficient fertility control at advantageously low dosage levels and thereby minimizes undesirable side-effects commonly associated with standard fertility control agents, e.g., those which comprise an estrogenic agent with a progestational agent.

The three above-mentioned activities can be observed in the white rat by standard test methods; e.g., the progestational activity can be demonstrated by the rat deciduoma method described by Yochim and DeFeo (Endocrinology 71:134, 1962), the estrogenic activity can be demonstrated by observation of cornification of vaginal epithelium of adult female ovariectomized white rats, e.g., by the method of Biggers and Claringbold, and estrogen-antagonistic activity can be demonstrated by observation of inhibition of cornification of vaginal epithelium of adult ovariectomized female white rats caused by standard estrogens.

This invention is illustrated but not limited by the following examples, wherein all temperatures are Centragrade, and room temperature is 20° to 30° C., unless indicated otherwise.

EXAMPLE 1

17α-Propadienylestra-4,9-dien-17β-ol-3-one

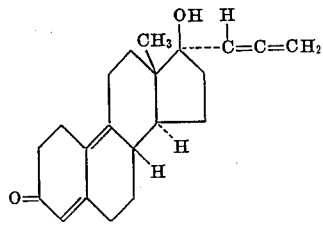

STEP 1.

17α-Dimethylaminopropynyl-3-ethylenedioxyestra-5(10),9(11)-dien-17β-ol.

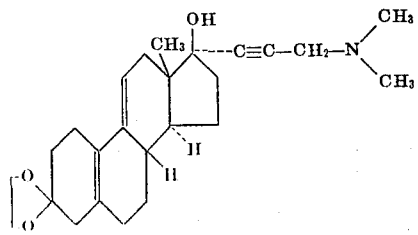

To a Grignard mixture, prepared from 1.50 g. of magnesium, 4.68 g. of ethyl bromide and 70 ml. of tetrahydrofuran, there is dropwise added 5.3 g. of dimethylaminopropyne, dissolved in 10 ml. of tetrahydrofuran. After the evolution of ethane ceases, a solution of 1.888 g. of 3-ethylenedioxyestra-5(10),9(11)-dien-17-one in 30 ml. of tetrahydrofuran is dropwise added, the temperature being maintained at 0°–5° C. during the addition and 20°–25° for 4 further hours. Aqueous 2 N NaOH solution (100 ml.) is added and the mixture concentrated in vacuo at temperatures not exceeding 30° C. until the total volume is 100 ml. The concentrated mixture is then extracted with ether (5 × 25 ml.), using a centrifuge to facilitate separation from the salt-containing aqueous phase. The product of this step (1) ($a_1$) is obtained by evaporating the dried ethereal solutions and pumping off any excess dimethylaminopropyne present.

STEP 2

17α-Dimethylaminopropynyl-3-ethylenedioxyestra-5(10),9(11)-dien-17β-ol Methiodide STEP 2 g. of 17α-dimethylaminopropynyl-3-ethylenedioxyestra-5(10), 9(11)-dien-17β-ol (product of step 1) is dissolved in 30 ml. of acetone. After addition of 3.2 g. of methyl iodide, the mixture is kept at 8° for 18 hours. The title product of this step (2) crystallizes and is isolated by filtration and washing with anhydrous ether.

STEP 3

3-Ethylenedioxy-17α-propadienylestra-5(10), 9(11)-dien-17β-ol

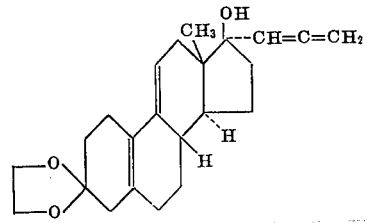

To a suspension of 2.75 g. of the methiodide of step 2, in 50 ml. of tetrahydrofuran, there is added, at −75°, 9.3 ml. of a 0.525 molar lithium aluminum hydride-tetrahydrofuran solution. The mixture is brought to −10° where it is stirred until ( ∼ 90 minutes) a clear solution is obtained. Finally it is kept at room temperature for 12 hours. 100 ml. of 2 N aqueous NaOH solution containing 50 mg. ditert.-butylcresol is added and the mixture concentrated in vacuo until the total volume is 100 ml. Extraction with 5 × 20 ml. ether on the centrifuge, drying the ethereal solutions over $K_2CO_3$ and evaporation gives the title product, 3-ethylenedioxy-17α-propadienylestra-5(10), 9(11)-dien-17β-ol.

STEP 4

17α-Propadienylestra-4,9-dien-17β-ol-3-one

3 G. of the product of step 3, i.e., 3-ethylenedioxy-17α-propadienylestra-5(10),9(11)-dien-17β-ol is dissolved in a mixture of 25 ml. of methanol and 0.8 ml. of 11 N aqueous hydrochloric acid and is kept at 30° C. for 30 minutes. After dilution with 50 ml. of water, the product is extracted with methylene chloride (5 × 8 ml.). Evaporation of the dried methylene chloride solutions, followed by recrystallization of the residue from methanol yields the title compound, 17α-propadienylestra-4,9-17β-ol-3-one.

Following the procedure of this example but using in place of the 3-ethylenedioxyestra-5(10),9(11)-dien-17-one starting material an equivalent amount of a. 13-Ethyl-3-ethylenedioxygona-5(10),9(11)-dien-17-one; or
b. 3-ethylenedioxy-13-n-propylgona-5(10),9(11)-dien-17-one, there is obtained:
a. 13-Ethyl-17α-propadienylgona-4,9-dien-17β-ol-3-one; or
b. 17α-propadienyl-13-n-propylgona-4,9-dien-17β-ol-3-one.

EXAMPLE 2

17α-Propadienylestra-4,9-dien-17β-ol-3-one

STEP 1

17α-Dimethylaminopropynyl-3-ethylenedioxyestra-5(10),9(11)-dien-17β-ol

To a solution of 2.5 g. of 3-ethylenedioxy-17α-ethynylestra-5(10),9(11)-dien-17β-ol in 25 ml. of dioxane, is added 2.5 ml. of dimethyl-amino methanol, 80 mg. of cuprous chloride and 1.4 ml. of glacial acetic acid. The stirred reaction mixture is then maintained at a temperature of 60° to 70° for 2½ hours and then cooled and diluted with ice/water containing sufficient sodium bicarbonate to insure that the solution remains basic. The organic material is extracted with methylene chloride and the solution so obtained dried over sulfate and evaporated. The residue is crystallized from acetone-petroleum ether (b.p.60°–90°); 1/1, to yield 17α-dimethylaminopropynyl-3-ethylenedioxyestra-5(10),9(11)-dien-17β-ol, m.p. 161°–163°.

STEP 2

Methiodide Salt

To a solution of 2.6 g. 17α-dimethylaminopropynyl-3-ethylenedioxyestra-5(10),9(11)-dien-17β-ol in 70 ml. of acetone is added 20 ml of methyl iodide. The solution is kept at a temperature of 5° for 18 hours and then the solvent removed and the residue is crystallized from acetone to yield the product, i.e., the methiodide salt of 17α-dimethylaminopropynyl-3-ethylenedioxyestra-5(10),9(11)-dien-17β-ol, m.p. 229°–230°.

STEP 3

3-Ethylenedioxy-17α-propadienylestra-5(10),9(11)-dien-17β-ol

To a suspension of 3.2 g. of the methiodide salt (prepared in Step 2), in 100 ml. of anhydrous tetrahydrofuran under ice cooling is added dropwise 16 ml. of a 0.85 M solution of lithium aluminum hydride in tetrahydrofuran. The reaction mixture is allowed to warm to room temperature and stirred for a total of 1-½ hours by which time solution is almost complete. Water is then added under cooling to decompose the excess hydride reagent, and on continued addition of water, a solid precipitates. This is isolated and dissolved in methylene dichloride. The organic solution is dried over sodium sulfate and evaporated to yield 3-ethylenedioxy-17α-propadienylestra-5(10),9(11)-dien-17β-ol.

STEP 4

17α-Propadienylestra-4,9-dien-17β-ol-3-one

Using the product of Step 3, above and repeating the procedure described in Step 4 of Example 1, yields the title compound, 17α-propadienyl-estra-4,9-dien-17β-ol-3-one.

EXAMPLE 3

17α-Dimethylaminopropynyl-3-ethylenedioxyestra-5(10),9(11)-dien-17β-ol

A total of 5.2 g. of lithium is added portionwise to 500 ml of ethylenediamine stirred and maintained at a temperature of 50°–60° under nitrogen. After the addition is complete, the resulting blue solution is heated to 95° for 1 hour when a pale yellow reaction mixture is obtained which is then cooled to 10° and 58 g. of dimethylaminopropyne is added dropwise over 5 minutes. Stirring is continued at room temperature for 1 hour, when a solution of 11 g. of 3-ethylenedioxyestra-5(10),9(11)-dien-17-one in 150 ml. of tetrahydrofuran is added. The mixture is now stirred at room temperature for 24 hours. After cooling (ice-water), 1,000 ml. of saturated aqueous sodium chloride are added and the resulting organic layer is separated. After drying over sodium sulfate, the solvent is removed and the residue is crystallized from acetone/pet. ether, 1/1, to yield 17α-dimethylaminopropynyl-3-ethylenedioxyestra-5(10),9(11)-dien-17β-ol, m.p. 161°–163°.

The thus-obtained intermediate compound may be utilized in the same manner as the product obtained in Step 1 of Example 2 to obtain 17α-propadienylestra-4,9-dien-17β-ol-3-one.

EXAMPLE 4

17β-Acetoacetoxy-17α-propadienylestra-4,9-dien-3-one

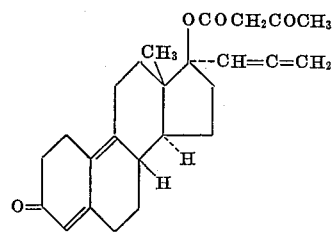

To a solution of 1.0 g. of 17α-propadienylestra-4,9-dien-17β-ol-3-one in a mixture of 18.5 ml. of benzene, 9.25 ml. of toluene and 0.23 ml. of pyridine, there is dropwise added, at 0°, 1.8 ml. of diketene, dissolved in 9 ml. of benzene. The mixture is then kept at 25° for 3 hours. The product is isolated by washing the mixture with ice-cold 0.1 N sodium hydroxide and water, drying over anhydrous sodium sulfate, evaporating to dryness and purifying the oil thus obtained by chromatoplate techniques (silica gel S development: $CHCl_3$—MeOH 98/2): $[\alpha]_D = -245.0$ (C=1, $CHCl_3$).

EXAMPLE 5

17β-Acetoxy-17α-propadienylestra-4,9-dien-3-one

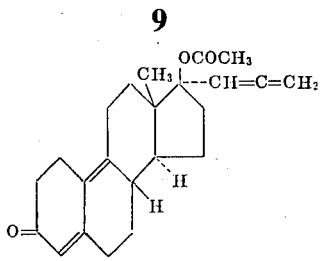

A mixture of 0.050 g. of calcium hydride in 5 ml. of acetic anhydride is refluxed for 1 hour then 0.5 g. of 17α-propadienylestra-4,9-dien-17βol-3-one is added and refluxing continued for 3 more hours. After cooling, the mixture is poured on ice and extracted with methylene chloride. The methylene chloride solution is washed with aqueous saturated sodium bicarbonate and then water, dried over anhydrous sodium sulfate and evaporated to give the oily product which is further purified by thin layer chromatography on silica gel (chloroform-methanol: 98/2). $[α]_D$= 233.4 (C=1, CHCl$_3$).

EXAMPLE 6

17β-Methoxy-17α-propadienylestra-4,9-dien-3-one

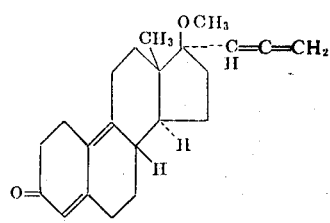

STEP 1

3,3-Dimethoxy-17α-propadienylestra-,5 (10), 9(11)-dien-17β-ol.

Repeating Steps 1, 2 and 3 of Example 1, but using 3,3-dimethoxy-17α-ethynylestra-5(10), 9(11)-dien-17-one in place of the 3-ethylenedioxyestra-5(10), 9(11)-dien-17-one used therein, there is obtained analogously 3,3-dimethoxy-17d$a-propadienylestra-5(10), 9(11)-dien-17β-ol.

STEP 2

3,3,17β-trimethoxy-17α-propadienylestra-5(10), 9(11)-diene

To a solution of lithium amide in liquid ammonia (prepared from 73.5 mg. Li and 26 ml. of NH$_3$) there is added a solution of 3.55 g of 3,3-dimethoxy-17α-propadienylestra - 5(10), 9(11)-dien-17β-ol in 50 ml of ether. After 2 hours at refluxing ammonia temperature, 2.5 g of methyl iodide is added and the ammonia allowed to escape. Addition of 50 ml of water and separation of the ether phase (and ether washup) followed by the evaporation of the dried ethereal solutions yields the title compound, 3,3,17β-trimethoxy-17 α-propadienylestra-5(10), 9(11)-diene.

STEP 3

17β-Methoxy-17α-propadienylestra-4,9-dien-3-one

Treating the product of step 2, above, by the procedure of step 4 of Example 1 yields the title product, 17β-Methoxy-17α-propadienylestra-4,9-dien-3-one.

What is claimed is:
1. A compound of the formula:

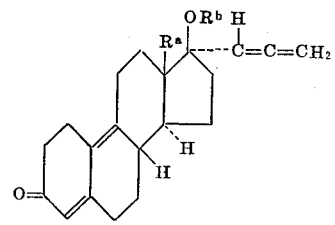

wherein $R^a$ is alkyl having one to three carbon atoms; and $R^b$ is a hydrogen atom, methyl, acetoacetyl or lower alkanoyl having two to four carbon atoms.

2. A compound of claim 1 wherein $R^a$ is methyl.
3. The compound of claim 2 wherein $R^b$ is a hydrogen atom.
4. The compound of claim 2 wherein $R^b$ is acetyl.
5. The compound of claim 2 wherein $R^b$ is acetoacetyl.
6. The compound of claim 2 wherein $R^b$ is methyl.
7. A compound of claim 1 wherein methyl, acetoacetyl is ethyl.
8. The compound of claim 7 wherein $R^b$ is a hydrogen atom.
9. A compound of the formula:

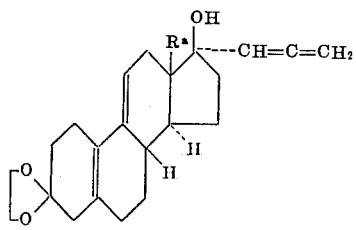

wherein $R^a$ is alkyl having from one to three carbon atoms.

10. The compound of claim 9 wherein $R^a$ is methyl.
11. The compound of claim 9 wherein $R^a$ is ethyl.

* * * * *

UNITED STATES PATENT AND TRADEMARK OFFICE
CERTIFICATE OF CORRECTION

PATENT NO. : 3,719,670
DATED : March 6, 1973
INVENTOR(S) : EUGENE E. GALANTAY & DIETMAR A. HABECK It is certified that error appears in the above—identified patent and that said Letters Patent is hereby corrected as shown below:

Column 6, end of line 23, (in the Title of Step 2 of Example 1) delete "STEP".

Column 10, line 40 (second line of claim 7), change "methyl,acetoacetyl" to -- $R^a$ --.

Signed and Sealed this

Third Day of March 1981

[SEAL]

Attest:

RENE D. TEGTMEYER

*Attesting Officer*     *Acting Commissioner of Patents and Trademarks*